United States Patent Office.

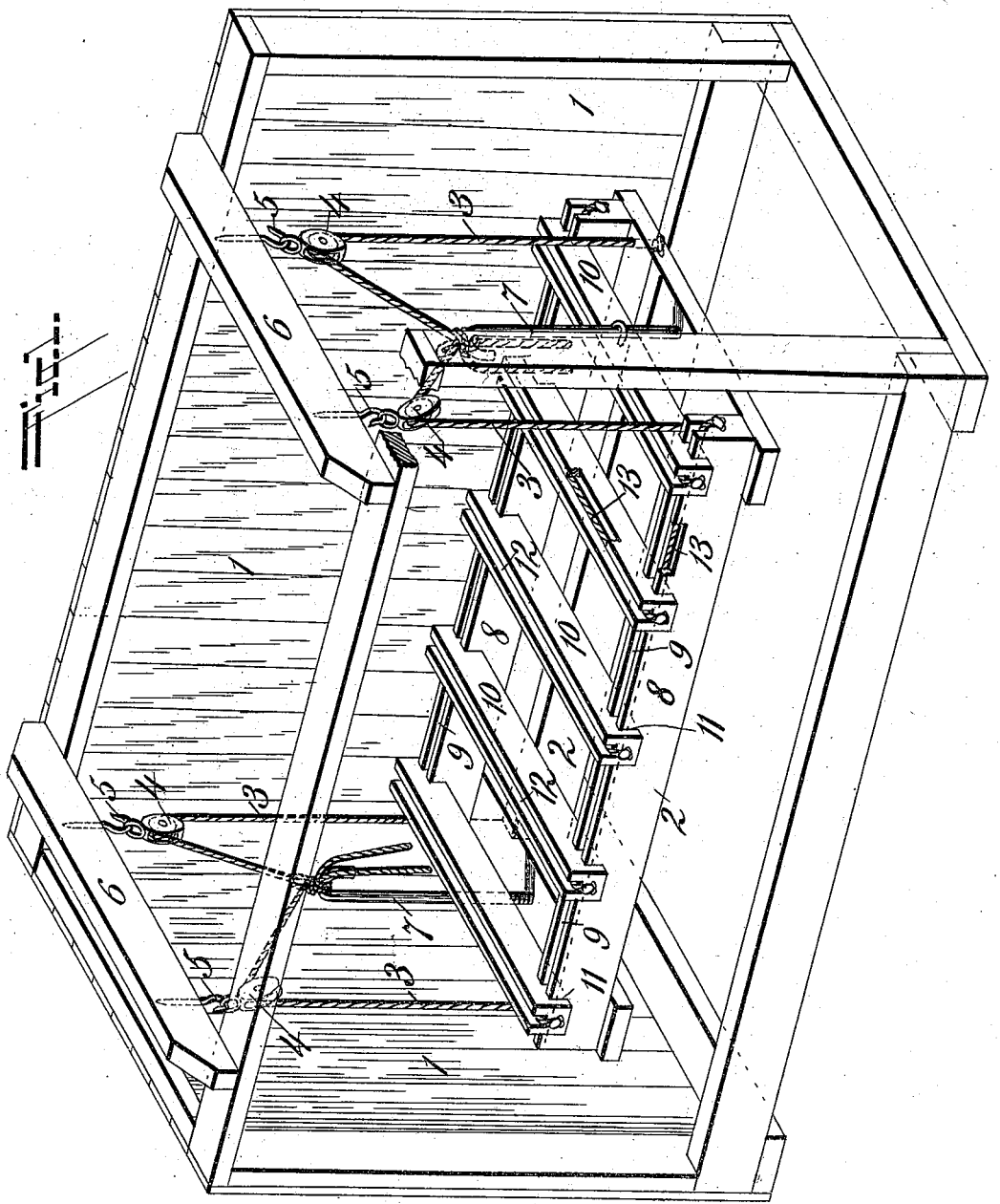

HORACE A. DOUD, OF FARMER, OHIO.

MEDICATED SUSPENSION-PERCH.

SPECIFICATION forming part of Letters Patent No. 510,847, dated December 12, 1893.

Application filed August 28, 1893. Serial No. 484,200. (No model.)

*To all whom it may concern:*

Be it known that I, HORACE A. DOUD, a citizen of the United States of America, residing at Farmer, in the county of Defiance and State of Ohio, have invented certain new and useful Improvements in Medicated Suspension-Perches; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates generally to chicken culture, and it has for its object to provide an improved perch or roost suspended away from the sides of the hen house and adapted to be raised or lowered so as to stand at any desired distance above the floor of the house as it may be used at the time for hens or for small chickens, and which will admit of being raised to such a height that free access may be had to the floor beneath the roost or perch for the purpose of removing manure, the perch or roost being provided with means for supporting it at the desired height of adjustment.

It has further for its object to provide an improved construction of perch or roost designed to prevent parasites such as "hen lice" and other parasites finding their way to the fowls when the latter are at roost upon the perch, the construction also being such that a suitable insecticide may distribute itself along the length of the perch so as to destroy any parasites that may find their way to the perch or roost.

To the accomplishment of the foregoing and such other objects as may hereinafter appear the invention consists in the construction and combination of parts hereinafter particularly described and then sought to be specifically defined by the claims, reference being had to the accompanying drawings forming a part hereof, and in which—

Figure 1 is a perspective of a portion of a hen house having my improved perch or roost applied thereto, and Fig. 2 a detail sectional view of a portion of the perch or roost showing the grooves formed in the transverse and longitudinal bars and cords fitted therein.

In the drawings the numeral 1 designates the frame of a hen house which may be of any suitable construction and dimensions. Within this house is suspended by suitable means a perch or roost 2, which preferably is suspended by means of cords, or cables 3 attached at one end to the corners of the perch or roost and passed over pulleys or sheaves 4 suspended by hooks 5 from cross timbers 6, and then secured to suitable hooks 7 attached to the perch or roost, preferably at opposite ends, so that the perch or roost will be suspended within the hen house and at a distance from the walls thereof so that no parasites can pass from the walls of the house to the perch or roost.

The perch or roost can be sustained at any height desired within the house by simply loosening the cords or cables from their attachment to hooks 7 and then drawing up or letting out the cable so as to raise or lower the perch or roost and then securing the cable to the hooks so as to hold the perch or roost in its adjusted position. By this means a perch or roost can be lowered and sustained very near to the ground or floor so that young chickens can readily get upon the same after which the perch can be raised to the height desired and thus elevate the fowls to a height where they will be free from marauding animals. This construction also admits of the perch or roost being elevated at such a height that persons can readily pass to and fro under the perch and roost for the purpose of removing manure from the house.

The perch or roost is preferably formed of longitudinal side bars 8 formed with longitudinal grooves 9 in their top edges and of transverse bars or rods 10 fitting at opposite ends in notches or ways 11 formed in the longitudinal side bars and having formed in their top edges longitudinal grooves 12. The purpose of the longitudinal grooves in the top edges of the side and transverse bars is to receive cords 13 of fibrous material which will serve to hold a suitable insecticide in the grooves throughout the length thereof. The cords being of a fibrous or absorbent material, the insecticide when introduced at one end of the groove will work its way along the fibrous material to the opposite end of the groove, and the absorbent quality of the cord will tend to hold more or less of the insecticide so that it at all times affords a sufficient supply thereof to destroy any "hen lice" or other parasites that might by any means find their way to the perch or roost. By the fibrous cords lying within the grooves and bearing against the side walls thereof, more or less of the insecticide will be transmitted from the fibrous cords to the side walls of the bars which preferably will be made of a soft wood, so that the top of the cross bars and side bars on which the fowl may roost will be supplied with the insecticide and thus the fowl when at rest will be standing upon a perch saturated or supplied with the insecticide whereby the latter will be transmitted to the feet of the fowl and the fowl thus provided with a protection against attack from parasites when off of the perch or roost.

A suitable insecticide, as kerosene oil, may be introduced in any quantity desired into the groove at one end of the side bars so as to flow freely to the opposite end and thus thoroughly cleanse the groove and at the same time saturate the cords lying therein so that a portion thereof will be retained and transmitted to the top of the bars as hereinbefore stated.

As a further safeguard against parasites finding their way to the perch or roost, the suspending cords or cables 3 may likewise be saturated with the insecticide and thus the possibility of the parasites finding their way to the perch or roost from the cross timbers of the hen house and down the cords or cables be prevented.

By causing the transverse bars 10 to fit in the notches or ways 11, formed in the side bars 8, the transverse bars will be held securely in place and yet will admit of easy removal so that easy access can be had to the grooves in the side bars for the purpose of removing the cords lying therein and replacing them with others when occasion may require.

I have described with particularity what I have found and believe to be the best construction of the several parts constituting my invention but it is obvious that changes can be made in the details without departing from the essential features of the invention.

Having described my invention and set forth its merits, what I claim is—

1. The combination with the frame of a chicken or poultry house, of a vertically adjustable perch or roost composed of longitudinal and transverse bars secured together to constitute a frame and formed with grooves to receive an absorbent material and insecticide, and means for adjustably suspending the perch within the house at a distance from the side walls thereof and at the height desired, substantially as and for the purposes described.

2. The combination with the frame of a chicken or poultry house, of a suspended perch or roost composed of longitudinal and transverse bars secured to each other and having their upper faces grooved and provided with corded absorbent material in said grooves the corded absorbent material to one set of said bars passing beneath the other set of bars, substantially as and for the purposes described.

3. The combination with the frame of a chicken or poultry house, of a suspended perch or roost composed of longitudinal side bars formed with channels for the flow of an insecticide and transverse bars likewise formed with channels for the flow of an insecticide one series of the bars fitting in notches formed in the other series and adapted to be removed therefrom, substantially as and for the purposes described.

In testimony whereof I affix my signature in presence of two witnesses.

HORACE A. DOUD.

Witnesses:
R. L. STARR,
HELEN G. WHITLOCK.